United States Patent [19]
Gallup

[11] Patent Number: 6,112,524
[45] Date of Patent: Sep. 5, 2000

[54] METHOD FOR REMOVING CONTAMINANTS FROM GEOTHERMAL STEAM

[75] Inventor: Darrell L. Gallup, Santa Rosa, Calif.

[73] Assignee: Union Oil Company of California, El Segundo, Calif.

[21] Appl. No.: 09/165,942

[22] Filed: Oct. 2, 1998

[51] Int. Cl.[7] .................................... F03G 7/00
[52] U.S. Cl. ............................ 60/641.2; 60/646; 60/649; 60/657
[58] Field of Search ............... 60/641.1, 641.5, 60/657, 646, 649, 641.2

[56] References Cited

U.S. PATENT DOCUMENTS

| | | | |
|---|---|---|---|
| 4,344,860 | 8/1982 | Plueddemann | 252/389 R |
| 4,357,214 | 11/1982 | La Mori et al. | 203/100 |
| 4,476,930 | 10/1984 | Watanabe | 166/279 |
| 4,508,537 | 4/1985 | Fenton et al. | 423/226 X |

OTHER PUBLICATIONS

Van der Leeden, *The Water Encyclopedia*, Second Edition, Lewis Publishers, Inc. (1990), Title Page, Copyright Page, and pp. 417–477.

Pontius, "An Update of the Federal Drinking Water Regs," *Journal of AWWA*, pp. 48–57, Feb. 1995.

Philippines NPCC Rules and Regulations, *Official Gazette*, vol. 74, No. 23, pp. 4467–4476, Jun. 5, 1978.

Philippines Ministry, Bureau and Office Administrative Orders and Regulations, *Official Gazette*, vol. 78, No. 1, pp. 52–54.

Philippines DENR Administrative Order No. 35 (DAO 35) "Revised Effluent Regulations of 1990, Revising and Amending the Effluent Regulations of 1982," by Department of Environment and Natural Resources, Mar. 20, 1990, pp. 1–15.

*Primary Examiner*—Hoang Nguyen
*Attorney, Agent, or Firm*—Gregory F. Wirzbicki

[57] ABSTRACT

Boron, silicon and/or arsenic in geothermal steam is removed by contacting the steam with an alcohol containing at least four carbon atoms or polyols having at least two carbon atoms.

45 Claims, No Drawings

METHOD FOR REMOVING CONTAMINANTS FROM GEOTHERMAL STEAM

BACKGROUND

Geothermal brine and steam reservoirs exist in many areas of the world and are a valuable energy resource. Some steam reservoirs yield a superheated steam which, after treatment to remove contaminants, can be used to power a turbine connected to an electrical generator. More usually, the reservoir yields a geothermal brine which must be flashed to produce steam to power the turbine. After powering the turbine, the exhausted steam is condensed in either a direct contact condenser or a surface condenser (e.g., a shell-and-tube-condenser) to produce steam condensate. The steam condensate is then, in the vast majority of cases, used as liquid water make-up to a cooling tower which provides the working fluid (i.e., the cooling medium) for condensing steam in the condenser.

Cooling in the cooling tower is accomplished by evaporation, which produces, as a side effect, the concentration of salts, minerals, and chemicals in the non-evaporated water. If a direct contact condenser is used, as is the case with most geothermal power plants, the cycles of concentration in the cooling tower are normally not controlled. If a surface condenser is used, such as a tube-and-shell condenser, the cooling tower is usually operated to control the concentration of salts by maintaining the cycles of concentration within predetermined limits. This is accomplished by controlling the cooling tower blow down, i.e., controlling the rate at which liquid water is discharged from the cooling tower system.

Depending upon the location of the geothermal power plant, the percentage of total condensate produced in the turbine-condenser system which eventually is evaporated or discharged as cooling tower blowdown is between about 70 and 95%, leaving about 5 to 30% of remaining condensate for disposal, e.g., discharge to the environment, as by distribution upon the earth's surface or discharge to a creek or river. Alternatively, this remaining condensate could be used for a beneficial purpose, e.g., industrial water or agricultural irrigation. Alternatively again, this remaining condensate could be re-injected into the geothermal resource formation, and in many cases this is desired to maintain the resource pressure and volume. However, in other cases, it is not desired, but becomes a necessity because the condensate contains one or more components in excess of applicable environmental discharge regulations. The cost of complying with such regulations—i.e., the cost to construct one or more re-injection wells and the associated surface facilities—is quite high, on the order of $4 million.

One component dissolved in the remaining condensate which may force the operator of a geothermal power plant to bear the cost of re-injection to comply with environmental regulations is boron. Geothermal brines and steam typically contain boron, and as a result the steam condensate obtained in the condenser contains boron.

Ironically, if the boron in the condensate could be controlled to low levels, its presence would actually be beneficial. Boron is one of sixteen important micro-nutrients needed for healthy crop growth—a factor favoring its presence in waters intended for agricultural purposes. On the other hand, boron in forms concentrated above the micro-nutrient level can inhibit starch formation and in yet higher concentrations prove toxic to plants. *The Water Encyclopedia*, Second Edition, by van der Leeden et al., Lewis Publishers, Inc. (1990), herein incorporated by reference in its entirety, specifies in Table 6–46 a 0.5 mg/l concentration as the "threshold level" below which the concentration "should be satisfactory for almost all crops and almost any arable soil." The "limiting concentration," "at which the yield of high-value crops might be reduced drastically, or at which an irrigator might be forced to less valuable crops" is identified as 2.0 mg/l. These limits are consistent with the data in Table 6–49 of van der Leeden et al. wherein the "permissible limits" for boron are broken down by crop group. For those most tolerant to boron, e.g., onion, asparagus, and date palm, the permissible limits are between 2 and 3 mg/l. For semi-tolerant crops, such as sunflower, potato, wheat, corn and lima bean, the permissible limits are between 1.33 and 2 mg/l. And for the most sensitive crops, such as pecans, plum, apple, and most especially citrus and avocado, the permissible limits are from 0.67 to 1 mg/l—values which are very much in line with the proposed 0.6 to 1 mg/l limits proposed for Federal drinking water regulations. See "An Update of the Federal Drinking Water Regs," by Pontius, *Journal AWWA*, pp. 48–57, February, 1995, herein incorporated by reference in its entirety; see especially Table 6 on page 56.

Due to the sensitivity of many crops to the presence of boron, the boron concentration in water used for agricultural purposes often must comply with local water quality regulations. Citrus are among the most sensitive receptors to boron and are adversely affected at a level of 0.75 mg/l—the limit for irrigation water in the Philippines (and others). See in particular pages 4468 and 4473 of the Philippines NPCC Rules and Regulations, *Official Gazette*, Vol. 74, No. 23, pp. 4467–4476, (1978) herein incorporated by reference in its entirety. In addition, the Philippines, per the Ministry, Bureau and Office Administrative Orders and Regulations, *Official Gazette*, Vol. 78, No. 1, pp. 52–54, which document is herein incorporated by reference in its entirety, set a 2 mg/l limit on boron for discharge to certain inland waters. The U.S. effluent standard is also 2.0 mg/l, per the 1978 Effluent Standards of the National Pollution Control Commission, herein incorporated by reference in its entirety.

Where no local regulations exist for boron in irrigation water, it would stand to reason that any water supplied or sold for irrigation obviously should not contain boron in a concentration greater than the toxicity level for the plant under cultivation. For example, 2 mg/l boron in water is harmful for rice growth. Hence, to be on the safe side, the boron concentration for waters supplied to rice fields should be no greater than 2 mg/l.

In light of the foregoing, it can be seen that condensate produced from boron-containing geothermal steam poses a difficulty for geothermal plant operations. The boron originally present in the geothermal steam and/or in the steam flashed from the brine, ultimately, after passage through the turbine, becomes a component of the liquid steam condensate. The boron concentration in the steam condensate is oftentimes far in excess of the 2 mg/l limit, requiring as a practical consequence that neither water directly taken from the condenser nor from cooling tower blowdown be used for high value agricultural purposes or discharged into rivers, streams, and the like. Both the condensate and the cooling tower blowdown must eventually be re-injected into the earth for environmental protection.

Another problem exacerbated by the presence of boron is cooling tower "drift"—i.e., the moisture carried from the cooling tower. If the moisture emitted from the cooling tower contains boron, say in a concentration of 2 mg/l or more, its ultimate deposition upon the ground can cause plant distress or death in the immediate vicinity—depending on the sensitivity of the local plants to boron. This "drift" problem is especially acute with respect to geothermal power plants processing superheated steam taken directly from the geothermal formation. As such formations become depleted, the boron concentration in the steam produced increases, resulting in increased boron concentration in the drift.

Besides boron, another contaminant in geothermal steam which can accumulate in the condensate in undesirable concentrations for irrigation purposes or for discharge to inland waters or to the environment in general (e.g., by distribution upon the soil) is arsenic. Arsenic generally does not present as pervasive a problem for geothermal operations as boron since its concentration in geothermal steam is usually low, as is its concentration in the resulting steam condensate. Nevertheless, there are instances where the geothermal steam can contain arsenic in unusually large concentrations to produce a condensate containing arsenic in a concentration too high for discharge per local regulations. Generally, a limit of 0.1 mg/l will pertain for discharge to the environment, and 0.05 mg/l is the usual maximum for drinking water, although Pontius reports that values in the range of 0.002 to 0.020 mg/l for drinking water were under consideration in the U.S. in 1995. Plant toxicity to arsenic varies widely, van der Leeden et al. indicating that the tolerance varies from as much as 12 mg/l for Sudan grass to less than 0.05 mg/l for rice. Perhaps because rice cultivation is an important agricultural activity in the Philippines, the maximum value permitted for irrigation is 0.01 mg/l, per the Philippines NPCC Rules and Regulations of 1978 set forth hereinbefore. These same regulations, however, set a maximum limit of 0.05 mg/l for most other fresh surface waters, including water used as the source of public water supply.

Yet another contaminant of concern in geothermal steam is silicon. Although its ultimate presence in the condensate is benign, the more difficult problem occurs upstream of the condenser. In particular, silicon comes out of the steam as it passes through the turbine, depositing on the blades and thus reducing the turbine operating efficiency.

SUMMARY OF THE INVENTION

In the present invention, one or more polyols or C4+ alcohols are blended into geothermal steam to remove at least some, and preferably a substantial proportion of, one or more of boron, arsenic, and silicon present as a contaminant in the steam.

DETAILED DESCRIPTION OF THE INVENTION

Because geothermal steam obtained directly from the geothermal resource or as flashed from geothermal brine contains impurities, the impure geothermal steam is generally subjected to a "steam cleaning" operation upstream of the turbine to remove the impurities. Generally, the steam cleaning is conducted by injecting water as a mist into the impure steam, the steam then, after passing some distance in a pipe functioning as a scrubbing zone, enters a "steam scrubber" which completes the scrubbing operation and serves as a liquid/vapor separator. Although the steam cleaning operation is effective for removing impurities, in particular chloride, some carry over of impurities into the steam leading to the turbine occurs. Among the contaminants carried over can be boron, silicon, and arsenic, with the rate and concentration at which each is carried over being dependent upon a number of factors, including the concentration of each in the impure steam to begin with and the efficacy of the steam cleaning operation to reduce the concentration(s) of these impurities.

Boron is typically present in the impure geothermal steam entering the steam scrubber in concentrations ranging from about 0.1 to about 10 mg/kg, silicon typically ranging from about 0.01 to about 2.5 mg/kg, and arsenic typically ranging from about 0.001 (the detection limit) to about 5 mg/kg. In conventional steam scrubbers using only water as the aqueous liquid scrubbant, some removal of the boron, arsenic, and silicon in the impure steam is achieved. For example, in Unocal's geothermal power plant at the Awibengkok field in Indonesia, on the order of about 25% of the boron, about 50% of the arsenic, and about 70% of the silicon in the impure steam is removed in the steam scrubber. Depending upon the geothermal power plant, and in particular upon such factors as the actual concentrations and mass rates of boron, arsenic, and silicon in the impure steam, the removal rates achieved in the steam scrubber, and the cycles of concentration in the cooling water (if a direct contact condenser is used), the percentage removal of boron, arsenic, and/or silicon may or may not cause downstream problems with respect to turbine scaling and/or contaminant concentration in the condenser. The present invention is most particularly addressed in the preferred embodiment to removing boron, silicon, and/or arsenic from geothermal steam when greater reductions are needed than can be obtained with conventional steam scrubbing operations using only water as the scrubbant.

In one embodiment, the present invention aims to remove one or more of boron, arsenic, and/or silicon from geothermal steam by introducing into the steam, preferably upstream of the steam scrubber, one or more C4+ alcohols, with the C4+ alcohol preferably being soluble or miscible in water, i.e., to the extent of at least about 1 gram per 100 gram of water at 25° C. By "alcohol" is meant any organic compound of formula ROH, where R is an organic group. A "C4+ alcohol" means any alcohol in which the R group contains at least 4 carbon atoms. Accordingly, the C4+ alcohol may be, for example, selected from the group consisting of n-butyl alcohol, pentyl alcohol, isobutyl alcohol, phenol, cresol, hydroquinone, and isoamyl alcohol.

Alternatively, in another embodiment of the invention, the alcohol employed in the invention is a polyol. By "polyol" is meant any organic compound containing at least two carbon atoms and further containing at least two hydroxyl groups(—OH) bonded to different carbon atoms. Thus, the polyol may be a diol, such as ethylene glycol, propylene glycol, trimethylene glycol, pinacol, and meso-2,3-Butanediol. The polyol may also contain more than two hydroxyl groups, such as glycerol or pentaerythritol. As with the C4+ alcohols, the preferred polyols are those soluble or miscible in water. Generally speaking, aliphatic polyols and C4+ alcohols are preferred over aromatic polyols or C4+ alcohols.

Although the invention is not to be limited to any theory of operation, it is believed that the alcohol reacts with boron, present in the steam as boric acid either in a volatile form in the steam phase and/or dissolved in the moisture phase (if any) of the steam, to produce a borine by the following generic reaction:

$$3\ ROH + B(OH)_3 \rightarrow B(OR)_3 + 3H_2O \qquad (I)$$

By employing a polyol or C4+ alcohol, the resultant borine will be of high boiling point—and therefore non-volatile under the usual temperature conditions associated with geothermal steam. Accordingly, the borine will then be captured and separated in the steam scrubber.

In a similar manner, it is believed that the alcohol will react with arsenious acid or arsenic acid present in the steam in a volatile form or dissolved in the moisture (if any) of the geothermal steam to produce an arsine, by the following generic reactions:

$$3 ROH + As(OH)_3 \rightarrow As(OR)_3 + 3H_2O \quad (II)$$

$$3 ROH + H_3AsO_4 \rightarrow OAs(OR)_3 + 3H_2O \quad (III)$$

And again similarly, the silicon in the steam, present as silicic acid either in a volatile form in the steam phase or dissolved in the moisture (if any) of the steam, is believed to react with the alcohol to produce a high boiling point ester, by the following generic reaction:

$$4 ROH + Si(OH)_4 \rightarrow Si(OR)_4 + 4H_2O. \quad (IV)$$

(It will be understood that, while the foregoing four reactions (I) to (IV) exemplify the reaction of a C4+ alcohol with boron, arsenic and silicon, respectively, similar reactions are believed involved with respect to a polyol, except that, depending upon the particular polyol chosen and the conditions of operation, not every hydroxyl group will necessarily react with the boron, arsenic, or silicon.)

Although one can add the alcohol to the steam at any rate that achieves some reduction in one or more of the boron, arsenic, and silicon in the geothermal steam entering the turbine, the alcohol is preferably added at a mass rate sufficient to achieve a substantial reduction in at least one of the three contaminants, e.g., sufficient to effect at least a 50% reduction and even more preferably at least a 75% reduction, or more, of at least one of the contaminants. Even more preferred is to obtain such reductions in at least two of said contaminants, and yet more preferred is the attainment of such reductions in all three. The alcohol may be added alone or, more preferably, in combination with water. It is contemplated that at least one of boron, arsenic, or silicon will be removed from the impure geothermal steam by a greater percentage than would be the case if only water were used in the same system. Of the contaminants which would otherwise remain after steam cleaning with only water, at least a 10% further reduction of at least one such contaminant, preferably at least a 25% further reduction, more preferably at least a 50% further reduction, and ideally and therefore most preferably at least a 75% further reduction is contemplated when an alcohol is employed in, or added to, the same system.

In one embodiment, the alcohol is added to the geothermal steam at a mass rate as controlled by the concentration of boron, arsenic, or silicon of a liquid stream comprising steam condensate yielded from the condenser. In the case of a surface condenser, this stream will usually consist essentially of only steam condensate whereas, in the case of a direct contact condenser, it will further comprise the liquid used as coolant—usually a liquid recovered from a cooling tower (which cooling tower typically employs steam condensate as make-up). This embodiment is especially applicable when boron and/or arsenic is (are) the primary contaminant(s) of interest. That is, if the desire is to maintain the condensate, or the coolant/condensate mixture, in a condition suitable for agricultural purposes or for discharge to the environment, then the silicon level is not of primary importance. The primary consideration will be to control the boron and/or arsenic concentration(s) in the liquid in the condenser to values appropriate for irrigation or discharge either to the environment or to an inland water body, as the case may be. When operating with a direct contact condenser where the steam condensate is the main source of make-up to the cooling tower and the aim is to discharge cooling tower blowdown directly to the environment or for agricultural purposes, it will be necessary to account for the cycles of concentration in order to keep the boron or arsenic within the chosen limits. For example, if the chosen maximum limits are 0.05 mg/l arsenic and/or 0.75 mg/l boron and the cycles of concentration value is 5, then the steam being condensed in the condenser would need to yield a steam condensate (ignoring the effects of the added coolant introduced into the condenser) containing arsenic and/or boron in concentrations of 0.01 and 0.15 mg/l, respectively, and one half these values if the cycles of concentration value is 10.

If silicon or arsenic is of primary interest due to concerns for lessening or preventing turbine scaling, the preferred control would be based on the silicon and/or arsenic content in a sample of steam at the inlet to the turbine. That is, the alcohol would be introduced into the steam at a mass rate sufficient to control the silicon and/or arsenic content entering the turbine to a predetermined maximum value.

If the silicon, boron, and/or arsenic levels in a particular geothermal plant are of concern as to both the possibility of turbine scaling and exceeding maximum limits for discharge from the condenser, the control of the alcohol feed rate in the preferred embodiment would be based upon the boron, silicon, and/or arsenic levels in the steam entering the turbine. However in nonpreferred embodiments it is possible to effectuate control based upon the levels of these contaminants in the steam condensate produced in the condenser. Ultimately, the choice of control—whether based on one or more of the contaminants in the condenser or in the steam entering the turbine—is largely a matter dependent upon the particular geothermal plant, and the needs and desire of the operator thereof. If control of the alcohol addition rate is made dependent upon the contaminant concentration in the geothermal steam at a point between the steam scrubber and the turbine, then, in the preferred operation, the alcohol is added at a rate sufficient to maintain the silicon content of the geothermal steam below about 0.5 mg/kg, the boron content below about 2 mg/kg, and the arsenic content below about 0.05 mg/kg. If control is to be based upon boron and/or arsenic in the condenser, or a liquid stream discharged therefrom, maximum values as selected based on the information set forth hereinbefore in the "Background" are preferred, with the chosen maximum value being largely dependent upon a number of factors, including, for example, the local discharge regulations.

It is recommended that the alcohol initially be fed at a stoichiometric rate to effect conversion of the three contaminants based on Reactions (I) to (IV) above. (If a polyol is used as the alcohol, the stoichiometric rate is based on the assumption that all the hydroxyl groups will react with the boron, silicon, or arsenic contaminant.) The alcohol may or may not effect full conversion, and depending on the results obtained, the operator may decide to either adjust the feed rate (either by increasing or decreasing the rate) to achieve the desired level of contaminants reduction. Regardless whether the desired level is attained, however, it is within the invention if some reduction occurs as a result of adding the alcohol.

Although it is preferred that the alcohol not be added at a rate in excess of that required for the desired removal of contaminants, if excess alcohol is present in the steam passing through the turbine into the condenser, normally the presence of such alcohol in the steam condensate or steam condensate/coolant mixture would be benign. In the event the presence of the alcohol is not benign, its conversion by bioreaction into the benign products of $H_2O$ and $CO_2$ is recommended before a beneficial use is made of the steam condensate or the steam condensate/coolant mixture.

Known methods applicable for determining boron content in water effluents are (a) per Philippines DENR Administrative Order No. 35 (DAO 35) ("Revised Effluent Regulations of 1990, Revising and Amending the Effluent Regulations of 1982," by Philippines Department of Environment and Natural Resources), herein incorporated by reference in its entirety, the Carmine Method (Colormetric Method) and (b) atomic absorption spectroscopy. Known methods applicable for determining the arsenic content in water effluents are (a) again per DAO 35, the Silver Diethyldithiocarbamate Method (Colorimetric) and (b) atomic absorption spectroscopy. Known methods applicable for determining the silicon content of water are atomic absorption spectroscopy and the Molybdate Method (Colorimetric). As used herein, the terms "boron," "arsenic," and "silicon" embrace all forms thereof, whether as the element or as a compound, in which each may be present in the geothermal steam.

Although the invention has been described in conjunction with its preferred embodiment as well as alternative embodiments, it is evident that many other alternatives, modifications, and variations will be apparent in light of the foregoing description. For example, although it is preferred that the alcohol be introduced into the steam prior to entry into the steam scrubber, adding the alcohol directly into the steam scrubber—either separately or additionally with water—is a contemplated alternative embodiment of the present invention. In another alternative embodiment, the alcohol is blended into the impure geothermal steam, and instead of employing a steam scrubber to capture the alcohol-contaminant reaction product, another suitable device, such as a demister, is used to separate the reaction product from the steam. Accordingly, it is intended to embrace within the invention all such alternatives, modifications, and variations as fall within the scope of the appended claims.

I claim:

1. A process for removing one or more contaminants elected from the group consisting of boron, silicon, and arsenic from geothermal steam containing at least one of said contaminants, said process comprising contacting said geothermal steam with a polyol or C4+ alcohol.

2. A process for removing from geothermal steam containing one or more contaminants selected from the group consisting of boron, silicon, and arsenic, said process comprising:
   (a) introducing into said geothermal steam an alcohol selected from the group consisting of polyols, C4+ alcohols, and mixtures thereof;
   (b) subsequently introducing the resultant steam into a scrubbing zone wherefrom a cleaned geothermal steam separated from a liquid comprising one or more of boron, silicon, and arsenic is obtained;
   (c) activating a turbine with said cleaned geothermal steam; and
   (d) condensing steam exhausted from said turbine in a condensing zone to produce a liquid comprising steam condensate.

3. A process as defined in claim 2 wherein said process is a continuous process.

4. A process as defined in claim 3 wherein the concentration of boron in the liquid comprising steam condensate produced in step (d) is controlled to a value no greater than about 2.0 mg/l at least in part by the rate at which alcohol is introduced in step (a).

5. A process as defined in claim 3 wherein the concentration of arsenic in the liquid comprising steam condensate produced in step (d) is controlled to a value no greater than about 0.1 mg/l at least in part by the rate at which alcohol is introduced in step (a).

6. A process as defined in claim 3 wherein the concentration of arsenic in the liquid comprising steam condensate produced in step (d) is controlled to a value no greater than about 0.01 mg/l at least in part by the rate at which alcohol is introduced in step (a).

7. A process as defined in claim 3 wherein the concentration of boron in the liquid comprising steam condensate produced in step (d) is controlled to a value no greater than about 0.75 mg/l at least in part by the rate at which alcohol is introduced in step (a).

8. A process as defined in claim 3 wherein the concentration of silicon of the cleaned steam obtained in step (b) is controlled to a value no greater than about 0.5 mg/kg at least in part by the rate at which alcohol is introduced in step (a).

9. A process as defined in claim 3 wherein the mass rate of at least one of said contaminants selected from the group consisting of boron, arsenic, and silicon recovered in said cleaned steam in step (b) is less than 50% of that of the geothermal steam entering said scrubbing zone.

10. A process as defined in claim 3 wherein the mass rate of at least one of said contaminants selected from the group consisting of boron, arsenic, and silicon recovered in said cleaned steam in step (b) is less than 25% of that of the geothermal steam entering said scrubbing zone.

11. A process as defined in claim 3 wherein the mass rate of at least two of said contaminants selected from the group consisting of boron, arsenic, and silicon recovered in said cleaned steam in step (b) is each less than 50% of that of the geothermal steam entering said scrubbing zone.

12. A process as defined in claim 3 wherein the mass rate of at least two of said contaminants selected from the group consisting of boron, arsenic, and silicon recovered in said cleaned steam in step (b) is each less than 25% of that of the geothermal steam entering said scrubbing zone.

13. A process as defined in claim 3 wherein the mass rate of each of the three contaminants selected from the group consisting of boron, arsenic, and silicon recovered in said cleaned steam in step (b) is less than 50% of that of the geothermal steam entering said scrubbing zone.

14. A process as defined in claim 3 wherein the mass rate of each of the three contaminants selected from the group consisting of boron, arsenic, and silicon recovered in said cleaned steam in step (b) is less than 25% of that of the geothermal steam entering said scrubbing zone.

15. A process as defined in claim 2 wherein said liquid comprising one or more of boron, arsenic, and silicon removed in step (b) from said scrubbing zone contains an ester of boron, arsenic, or silicon.

16. A process as defined in claim 2, 3, 4, 5, 6, 7, 8, 9, 10, 11, or 12 wherein said alcohol in step (a) is selected from the group consisting of n-butyl alcohol, isobutyl alcohol, phenol, cresol, hydroquinone, isoamyl alcohol, glycols, and glycerols.

17. A process as defined in claim 2 wherein said alcohol and said contaminant react in said geothermal steam to produce an ester of boron, silicon, or arsenic.

18. A process as defined in claim 2 or 3 wherein said liquid produced in said condensing zone in step (d) is of irrigation quality suitable for growing rice.

19. A method for reducing the concentration of boron, silicon, or arsenic in a liquid contained in a condenser wherein geothermal steam containing boron, silicon, or arsenic is exhausted from a turbine of a geothermal power plant to be condensed, said method comprising reacting boron, silicon, or arsenic in the geothermal steam with a polyol or a C4+ alcohol and removing at least some of the resultant reaction product from said geothermal steam, with both said reacting and removing being conducted prior to the exhausting of said steam into the condenser.

20. A method as defined in claim 1, 2, or 19 resulting in the removal of at least some boron.

21. A method as defined in claim 20 wherein at least 25% of the boron is removed from said geothermal steam.

22. A method as defined in claim 20 wherein at least 50% of the boron is removed from said geothermal steam.

23. A method as defined in claim 20 wherein at least 75% of the boron is removed from said geothermal steam.

24. A method for reducing the concentration of boron or arsenic in droplets of moisture emitted from a cooling tower associated with a geothermal power plant, said cooling tower having as a source of make-up steam condensate from a condenser condensing geothermal steam containing boron or arsenic exhausted from a turbine, said method comprising introducing a polyol or an alcohol containing at least four carbon atoms into said geothermal steam upstream of said condenser and separating sufficient boron or arsenic such that a steam condensate is produced in the condenser of substantially reduced boron or arsenic content.

25. A method as defined in claim 24 resulting in the concentration of boron or arsenic in said droplets of moisture being reduced by at least 25%.

26. A method as defined in claim 24 resulting in the concentration of boron or arsenic in said droplets of moisture being reduced by at least 50%.

27. A method as defined in claim 24 resulting in the concentration of boron or arsenic in said droplets of moisture being reduced by at least 75%.

28. A method as defined in claim 24 resulting in the concentration of boron in said droplets of moisture being reduced by at least 25%.

29. A method as defined in claim 24 resulting in the concentration of boron in said droplets of moisture being reduced by at least 50%.

30. A method as defined in claim 24 resulting in the concentration of boron in said droplets of moisture being reduced by at least 75%.

31. A method as defined in claim 24 resulting in the reduction in the concentration of boron in said droplets of moisture.

32. A process as defined in claim 1, 2, or 9 wherein said geothermal steam containing one or more contaminants selected from the group consisting of boron, silicon, and arsenic contains at least 2 mg/kg boron, at least 0.5 mg/kg silicon, or at least 0.05 mg/kg arsenic.

33. A process as defined in claim 1, 2, or 9 wherein said geothermal steam containing one or more contaminants selected from the group consisting of boron, silicon, and arsenic contains at least 2.5 mg/kg boron, at least 0.75 mg/kg silicon, or at least 0.1 mg/kg arsenic.

34. A process as defined in claim 1, 2, or 9 wherein said geothermal steam containing one or more contaminants selected from the group consisting of boron, silicon, and arsenic contains at least 3.0 mg/kg boron, at least 1 mg/kg silicon, or at least 0.25 mg/kg arsenic.

35. A process as defined in claim 1, 2, or 9 wherein said geothermal steam containing one or more contaminants selected from the group consisting of boron, silicon, and arsenic contains at least 3.5 mg/kg boron, at least 1.25 mg/kg silicon, or at least 0.5 mg/kg arsenic.

36. A process as defined in claim 1, 2, or 9 wherein said geothermal steam containing one or more contaminants selected from the group consisting of boron, silicon, and arsenic contains at least 4.0 mg/kg boron, at least 1.5 mg/kg silicon, or at least 1 mg/kg arsenic.

37. A process as defined in claim 1, 2, or 9 wherein said geothermal steam containing one or more contaminants selected from the group consisting of boron, silicon, and arsenic contains at least 4.5 mg/kg boron, at least 1.75 mg/kg silicon, or at least 1.5 mg/kg arsenic.

38. A process as defined in claim 1, 2, or 9 wherein said geothermal steam containing one or more contaminants selected from the group consisting of boron, silicon, and arsenic contains at least 5 mg/kg boron, at least 2 mg/kg silicon, or at least 2 mg/kg arsenic.

39. A process as defined in claim 1, 2, or 9 wherein said geothermal steam containing one or more contaminants selected from the group consisting of boron, silicon, and arsenic contains at least 6 mg/kg boron, at least 2.25 mg/kg silicon, or at least 3 mg/kg arsenic.

40. A process as defined in claim 1, 2, or 13 wherein said geothermal steam containing one or more contaminants selected from the group consisting of boron, silicon, and arsenic contains at least 2 mg/kg boron, at least 0.5 mg/kg silicon, and at least 0.05 mg/kg arsenic.

41. A process as defined in claim 1, 2, or 13 wherein said geothermal steam containing one or more contaminants selected from the group consisting of boron, silicon, and arsenic contains at least 3.0 mg/kg boron, at least 1 mg/kg silicon, and at least 0.25 mg/kg arsenic.

42. A process as defined in claim 1, 2, or 13 wherein said geothermal steam containing one or more contaminants selected from the group consisting of boron, silicon, and arsenic contains at least 4.5 mg/kg boron, at least 1.75 mg/kg silicon, and at least 1.5 mg/kg arsenic.

43. A process as defined in claim 1, 2, or 13 wherein said geothermal steam containing one or more contaminants selected from the group consisting of boron, silicon, and arsenic contains at least 6 mg/kg boron, at least 2.25 mg/kg silicon, and at least 3 mg/kg arsenic.

44. A geothermal steam comprising the reaction product of a polyol or a C4+ alcohol with a component selected from the group consisting of boron, silicon, and arsenic.

45. A geothermal steam as defined in claim 21 wherein said reaction product comprises an ester of boron, silicon, or arsenic.

* * * * *